United States Patent [19]

Thornton

[11] Patent Number: 5,415,848

[45] Date of Patent: May 16, 1995

[54] METHOD FOR REMOVAL OF HEXAVALENT CHROMIUM FROM A SOLUTION

[75] Inventor: Roy F. Thornton, Schenectady, N.Y.

[73] Assignee: General Electric Company, N.Y.

[21] Appl. No.: 80,549

[22] Filed: Jun. 24, 1993

[51] Int. Cl.$^6$ ............ C22B 34/30; C01G 37/00; C02F 1/00

[52] U.S. Cl. ............ 423/55; 423/57; 423/166; 210/749; 210/757; 210/913; 204/DIG. 13

[58] Field of Search ............ 204/129.75, DIG. 12, 204/DIG. 13; 210/749, 757, 913; 423/55, 57, 166

[56] References Cited

U.S. PATENT DOCUMENTS 3,607,482  9/1971  Selm ............ 210/913
3,810,542  5/1974  Gloster ............ 423/55

FOREIGN PATENT DOCUMENTS 57-75186  5/1982  Japan ............ 210/757
1323537  7/1987  U.S.S.R. ............ 423/55

*Primary Examiner*—Steven Bos
*Attorney, Agent, or Firm*—James Magee, Jr.

[57] ABSTRACT

A process for removing chromium from an aqueous electrolyte solution is disclosed. The process involves admixing with the solution an amount of a chromium-reducing compound and an amount of a precipitant for the anion of the chromium-reducing compound. The invention provides for substantially complete reduction of hexavalent chromium to trivalent chromium and the formation of an insoluble chromium-containing material without leaving unwanted ions in the aqueous electrolyte solution. The aqueous electrolyte solution is regenerated by adjustment of pH and electrolyte concentration.

2 Claims, No Drawings

METHOD FOR REMOVAL OF HEXAVALENT CHROMIUM FROM A SOLUTION

FIELD OF THE INVENTION

This invention relates to a method for treatment of aqueous compositions contaminated with hexavalent chromium, and particularly, to the reduction of hexavalent chromium to trivalent chromium by a chromium-reducing compound with a precipitant for anions of the chromium-reducing compound so that unwanted ions do not remain in the solution.

BACKGROUND OF THE INVENTION

Numerous processes have been proposed to remove hexavalent chromium from aqueous solutions. Examples of industrial solutions that require removal of hexavalent chromium include: chromium plating baths, etching solutions, electrochemical machining solutions, rinse waters, and waste waters.

Methods employed in industry to remove chromium from various solutions can be classified as ion exchange or adsorption (see U.S. Pat. Nos. 3,835,001; 4,376,706; and 4,952,320) ;electrochemical generation of ferrous ions; direct precipitation of chromium with a salt dissolved in the solution (see U.S. Pat. Nos.3,969,246; 4,481,090; and 5,098,579); and chemical reduction of hexavalent chromium to trivalent chromium, followed by precipitation of the trivalent chromium.

Ion exchange is a unit process by which ions of a given species are displaced from an insoluble exchange material by ions of a different species in solution. The chromium-containing solution enters one end of the column under pressure, passes through the resin bed, and the chromium is removed from the solution. When the resin capacity is exhausted, the column is backwashed to remove trapped solids and then regenerated.

A disadvantage of an ion exchange method for chromium removal is that ion exchange resins are very selective. A resin must be chosen that selectively removes the metal contaminant of concern. Further, ion exchange equipment can be expensive and there can be incomplete removal of the chromium from the salt solution.

Another method for removing chromium from solution is the electrochemical generation of ferrous ions. This involves passing a liquid stream containing heavy metals at a controlled rate through a small gap between cold-rolled steel electrodes. The direct current passing through these electrodes forms ferrous iron at the anode, while hydroxide and hydrogen gas are produced at the cathode. The ferrous iron reduces the hexavalent chromium to trivalent chromium and in turn is oxidized to ferric iron. For every three ferrous ions oxidized one hexavalent chromium is reduced. The trivalent chromium, ferric, and leftover ferrous ions then react with the hydroxide being formed at the cathode resulting in insoluble chromium and iron hydroxides.

This process suffers from the shortcoming of utilizing costly and complex equipment. Adjustment of the pH to a neutral range, and possibly an acidic range may be required. Also, another drawback is that the process may not work with nitrate solutions.

Another method for chromium removal from aqueous solutions is the direct precipitation of chromium as chromate, utilizing cations.

U.S. Patent No. 3,969,246 of Feltz and Cunningham discusses a process where chromium is removed from waste water by direct precipitation using barium carbonate in aqueous solutions acidified with glacial acetic acid, followed by filtration of the resultant chromium material.

Childs describes, in U.S. Pat. No. 4,481,090, chromium removal from an electrolytic solution that is used to decontaminate radioactive surfaces. Lead or barium cations are added to the solution. The chromium ions in solution are precipitated as lead chromate or barium chromate.

In other known processes for removal of chromium from aqueous solutions, chemical reduction has been used to reduce hexavalent chromium to trivalent chromium. It is known that ferrous sulfate is often used to reduce hexavalent chromium to trivalent chromium. Chromic hydroxide is formed with iron hydroxides and is precipitated under alkaline conditions. The resultant precipitate is removed by conventional means such as filtration.

Peterson and Dexter describe, in U.S. Pat. No. 3,616,344, the reduction of hexavalent chrome in an alkali metal chlorate solution used for electrochemical machining. The solution is treated with either a ferrous salt, an alkali metal, ammonium sulfide, or a stannous salt to reduce hexavalent chromium to the trivalent chromium. The chromium precipitates from solution as hydrous chromic oxide.

Prior art processes for the removal of hexavalent chromium from aqueous solutions are effective for the purpose intended, but they have disadvantages. The ion exchange and electrochemical generation of ferrous ion processes utilize costly and complex equipment. The direct precipitation method generally leaves the chromium in the toxic hexavalent state. Both the direct precipitation of chromium and the chemical reduction of hexavalent chromium to trivalent chromium, followed by precipitation of trivalent chromium, introduce unwanted ions into solution. The prior art does not provide a method to reduce hexavalent chromium to trivalent chromium, remove chromium from the aqueous electrolyte solution,and regenerate the solution without introduction of unwanted ions.

There is a need to develop a method that reduces hexavalent chromium to trivalent chromium in aqueous electrolyte solutions, removes the trivalent chromium from the solution, and restores the solution to its original condition free of unwanted ions.

SUMMARY OF THE INVENTION

Generally, this invention fulfills the need by providing a method for the removal of chromium from an aqueous electrolyte solution which comprises admixing with the solution an effective amount of a chromium-reducing compound and an effective amount of a precipitant for the anion of the chromium-reducing compound. The pH is adjusted to a level sufficient to precipitate trivalent chromium and cations from the chromium-reducing compound.

The insoluble materials are separated from the aqueous electrolyte solution by conventional means, such as filtration. Both the pH of the aqueous electrolyte solution and the electrolyte concentration are adjusted to a value required for use of the solution. Thus, chromium is removed without leaving unwanted ions in the aqueous electrolyte solution.

Aqueous electrolyte solutions are useful in many industrial processes. An example of such a process is electrochemical machining. An illustration of electrochemical machining is the use of an aqueous electrolyte, such as sodium nitrate, to electrochemically machine stainless steel alloys.

When stainless steel alloys are electrochemically machined, at least part of the chromium metal in the stainless steel is converted to hexavalent chromium in the aqueous electrolytic solution. The hexavalent chromium remains in solution over a wide range of pH, from strongly acidic to strongly basic. If not treated over a period of time, the hexavalent chromium in solution accumulates and poses an environmental and health hazard. Thus, the chromium concentration in the aqueous electrolyte solution needs to be as low as practical, while still maintaining the properties of the aqueous electrolyte.

To lower the chromium concentration in the aqueous electrolytic solution, an effective amount of a chromium-reducing compound is added to the solution. A chromium-reducing compound is a compound which is capable of reducing the hexavalent chromium that is present in the aqueous electrolytic solution to trivalent chromium. An effective amount of a chromium-reducing compound is an amount which is sufficient to reduce substantially all of the hexavalent chromium in the aqueous electrolytic solution to trivalent chromium. In general, an effective amount is about 20% excess over the stoichiometric amount required to reduce substantially all of the hexavalent chromium. Ferrous sulfate is illustrative of a chromium-reducing compound that can be used with an aqueous electrolyte such as sodium nitrate.

An anion precipitant, that removes the anion of the chromium-reducing compound, is important for the practice of this invention. The cation of the anion precipitant forms an insoluble compound with the anion of the chromium-reducing compound by adding an effective amount of the anion precipitant to the aqueous electrolyte solution. An effective amount of the anion precipitant is an amount required to precipitate substantially all of the anion associated with the chromium-reducing compound. It is also important to the practice of the invention that the anion precipitant does not form insoluble compounds with the anions of the electrolyte in the aqueous solution.

The invention provides for substantially complete reduction of hexavalent chromium to trivalent chromium in an aqueous electrolyte solution and the formation of an insoluble chromium-containing material without leaving unwanted ions in the system.

One aspect of the invention is that the properties of the aqueous electrolyte solution remain unaltered subsequent to the removal of the insoluble chromium-containing material. Thus, the electrolyte is able to be reused.

This value of the invention is further enhanced by removal of essentially all chromium from the aqueous electrolyte solution. Thus, the toxicity of the solution is lowered.

Accordingly, it is an object of this invention to provide an environmentally safe and economical process for removing and recovering chromium material from aqueous electrolyte solutions through the addition of a chromium-reducing compound and an anion precipitant without leaving unwanted anions in the solution.

DETAILED DESCRIPTION OF THE INVENTION

In the present invention the more toxic hexavalent chromium is chemically reduced to less toxic trivalent chromium through the addition of a chromium-reducing compound that is chemically capable of reducing hexavalent chromium to trivalent chromium. At a pH of about 3 to about 15, the trivalent chromium forms an insoluble material, which is removed from a salt solution by conventional means. The metal cation of the chromium-reducing compound is oxidized. The metal cations form insoluble hydroxides at a sufficiently high pH. Any unwanted anions that are introduced into the aqueous electrolyte solution by the chromium-reducing compound are removed as insoluble compounds.

An anion precipitant, which has a cation with a strong affinity for the unwanted anions, interacts with such anions in the aqueous electrolyte solution to form an insoluble compound which is removed with the insoluble chromium-containing material and the insoluble metal hydroxide material. The net effect is the substantial removal of chromium from the aqueous electrolyte solution without leaving signigicant quantities of unwanted anions so that the solution can be reused for its original purpose.

The aqueous electrolyte solution in the present invention is used in electrochemical machining. A salt used as an electrolyte in electrochemical machining is sodium nitrate. The concentration of the sodium nitrate is about 50 grams per liter to about 600 grams per liter. The preferred concentration of sodium nitrate in such electrochemical machining solution is about 3 molar.

In the practice of this invention it is usual to determine the chromium content of the aqueous electrolyte solution. This is done by taking an aliquot portion of the solution and analyzing it for chromium content. Means and methods for doing this are well known to those familiar with the art.

Upon ascertaining the chromium content in the aqueous electrolyte solution by means of elemental chemical analysis, a sufficient amount of a soluble chromium-reducing compound is added to the aqueous electrolyte solution. An excess up to about 20% of the stoichiometric amount of the chromium-reducing compound is preferred to insure maximum reduction of hexavalent chromium to trivalent chromium.

The preferred chromium reducing compound is a ferrous compound. Ferrous ion reduces the hexavalent chromium to trivalent chromium, while the ferrous ion is oxidized to the ferric ion. Three ferrous ions are needed to reduce one hexavalent chromium ion no trivalent chromium. Ferrous ion reduction of hexavalent chromium to trivalent chromium occurs on dissolution of the ferrous compound. Subsequent precipitation of trivalent chromium is accomplished by pH adjustment.

Ideally, the ferrous compound should be compatible with the electrolyte system. However, in some cases the ferrous compound that is compatible with the electrolyte salt may not be easily available. As a result, a different ferrous compound can be utilized. Often, ferrous sulfate is preferred.

A coherent group of chromium-reducing compounds includes stannous compounds, such as stannous sulfate and stannous chloride.

In order to remove unwanted anions, an anion precipitant is added to the aqueous electrolyte solution. The unwanted anions form insoluble compounds and are precipitated. The amount of anion precipitant that is needed to precipitate the unwanted anions is about a 1:1 stoichiometric ratio to the chromium-reducing compound.

Generally, the anion precipitant is a metal salt or a metal hydroxide. The cations of preferred metal salts or metal hydroxides have a strong affinity for the unwanted anions of the reducing compound and form insoluble reaction products with the anions in a designated pH range. The anion of the metal salt or metal hydroxide must be compatible with the electrolyte of the solution.

Barium nitrate is an example of a metal salt that acts as a precipitant for removal of unwanted anions. By illustration, the addition of barium nitrate to a sodium nitrate aqueous solution, with ferrous sulfate as the chromium-reducing compound, precipitates out the unwanted anion, sulfate, as barium sulfate.

Subsequently, the pH of the electrolyte is adjusted to between about 8.5 and about 14 in order to precipitate substantially all of the trivalent chromium material, as well as the ferric and ferrous material.

When the electrolyte is sodium nitrate, the addition of NaOH to make the salt solution basic, completes the precipitation of iron and chromium species. The nee result is the removal of the chromium from solution, the generation of 6 moles of sodium nitrate per mole of chromium removed, and the consumption of a small amount of water.

Essentially all chromium, iron, barium, and sulfate precipitate out of solution and can be removed by conventional settling, clarification, and filtration methods. The only species left in the electrolyte, except for traces of barium and sulfate, is sodium nitrate.

Barium hydroxide is an example of a metal hydroxide that can be used as an anion precipitant. By adding barium hydroxide to the aqueous electrolyte solution, the sulfate anion, as well as the ferrous, ferric, and chromic cations, are precipitated. The barium hydroxide raises the pH of the aqueous electrolyte solution above the desired range. The pH of the aqueous electrolyte solution is then adjusted with a compatible acid to a range that is useful for the electrochemical process. The net result is removal of chromium from solution, generation of 2 moles of sodium nitrate per mole of chromium removed, and the consumption of a small amount of water. Essentially all chromium, iron, barium, and sulfate precipitate out of solution.

The above methods are applicable to treatment of large volumes of aqueous electrolyte solution. The amounts of chemicals added would be matched stoichiometrically to the amount of hexavalent chromium in the aqueous electrolyte solution.

Throughout the processing of the aqueous electrolyte solution with the chromium-reducing compound and anion precipitant, mixing is done for a sufficient period of time to insure the substantial formation of trivalent chromium material, ferric and ferrous material, and compounds formed from the unwanted anions.

The method proceeds at a temperature between about 0° C. and about 100° C. The preferred temperature of the system is about 43° C.

Following the precipitation and subsequent removal of the trivalent chromium material, the ferric and ferrous material, and the unwanted anions, the pH is adjusted with a compatible acid or base and the concentration of the aqueous electrolyte solution is adjusted by the addition of the electrolyte salt or water.

The following examples are presented only for purposes of illustration and are not intended to limit the scope of the invention. Many other improvements may become apparent to the skilled artisan after reading the patent application and those improvements are considered to be a part of the present invention.

EXAMPLE 1

An aqueous solution was made in which the concentration of sodium nitrate was 270 grams per liter and the concentration of sodium chromate was 1.55 grams per liter. Subsequent analysis of the solution determined that the chromium concentration, as metal, was 450 micrograms per milliliter. The solution, weighing 49.8 grams, was put in a beaker. Solid ferrous sulfate heptahydrate, 0.363 grams, was added while the solution was stirred. In 5 minutes, no ferrous sulfate granules were visible; and the pH had dropped to 2.6. A brown precipitate had formed. Next, 0.411 grams of barium hydroxide octahydrate were added while stirring was continued. In 3 minutes, the pH had risen to 10.9. Some white flakes were still visible. Between 4 and 9 minutes nitric acid was added to reduce the pH to 8.3, a value within the range of pH used for electrochemical machining. At 10 minutes, the stirring was stopped and a sample of the precipitate-containing solution was centrifuged. The color of the supernatant was clear and water white. At 23 minutes stirring was restarted and continued until 32 minutes. A few white flakes remained. The precipitate was dark brown, and the supernatant after centrifuging was water white. Analysis of the supernatant determined that the residual chromium concentration was less that the lower detection limit of 0.5 micrograms per milliliter. The concentration of sulfate was $4.1 \times 10^{-3}$ molar and the concentration of barium was $0.98 \times 10^{-4}$ molar. If all of the added sulfate and barium had remained in solution, the concentrations of each would have been $3.1 \times 10^{-2}$ molar. A permanganate titration of the supernatant found no detectable amount of nitrite ions.

EXAMPLE 2

The following example illustrates that barium nitrate can be used in place of barium hydroxide in the treatment of an aqueous electrochemical machining electrolyte to remove hexavalent chromium.

Electrolyte from an electrochemical machining operation contained about 7000 micrograms hexavalent chromium per milliliter of solution. The nominal sodium nitrate concentration was 270 grams per liter, and the electrolyte contained small amounts of nitrite ions and undefined organic compounds.

An aliquot, 54.57 grams, of the electrochemical machining electrolyte was put in a beaker. While the solution was stirred, 5.84 grams of ferrous sulfate heptahydrate were added. Within 5 minutes the solution was opaque with a dark brown precipitate. The pH was about 2.5. When the pH was raised to 8.1 with sodium hydroxide solution, the solution became very viscous with more precipitate. When the mixture was centrifuged, the supernatant was clear without color. The concentration of hexavalent chromium was estimated to be less than 5 parts per million based on visual comparison of the supernatant with a standard solution containing 5 parts per million of hexavalent chromium. To 31.83 grams of the clear supernatant, 3.20 grams of barium nitrate was added while the mixture was stirred. This amount of barium was just sufficient to provide one barium atom per sulfate ion. After about 40 minutes all of the white barium nitrate had dissolved, and a beige precipitate had formed. When the mixture was centrifuged, the supernatant was clear without color. Because the solubility of barium sulfate in water is about 0.0025 grams per liter at room temperature, the beige precipitate was most likely barium sulfate, and most of the sulfate had been removed from solution.

The low solubility of barium sulfate in the sodium nitrate solution was confirmed in a separate experiment. Sodium sulfate was added to an aqueous solution of 270 grams per liter of sodium nitrate. The resulting solution contained 167 micrograms per milliliter of sulfur. When barium nitrate was added to the solution, a white precipitate appeared. The amount of barium nitrate added was a 1:1 stoichiometric ratio of barium nitrate to sodium sulfate.

What is claimed is:

1. A method for removing chromium from an aqueous sodium nitrate solution containing hexovalent chromium which comprises admixing with the solution an effective amount of a chromium-reducing compound, consisting of ferrous sulfate to reduce all of the hexavalent chromium in the aqueous sodium nitrate solution to trivalent chromium, and an effective amount of barium nitrate to precipitate all of the sulfate anion of the chromium-reducing compound, adjusting the pH to between about 8.5–14.0 by adding sodium hydroxide to the solution to precipitate all of the trivalent chromium and ferrous cation of the chromium-reducing compound and then removing the trivalent chromium precipitate from the aqueous sodium nitrate solution.

2. A method for removing chromium from an aqueous sodium nitrate solution containing hexavalent chromium which comprises admixing with the solution an effective amount of a chromium-reducing compound, consisting of stannous sulfate to reduce all of the hexavalent chromium in the aqueous sodium nitrate solution to trivalent chromium, and an effective amount of barium nitrate to precipitate all of the sulfate anion of the chromium-reducing compound, adjusting the pH to between about 8.5–14.0 by adding sodium hydroxide to the solution to precipitate all of the trivalent chromium and stannous cation of the chromium-reducing compound and then removing the trivalent chromium precipitate from the aqueous sodium nitrate solution.

* * * * *